United States Patent [19]

Taniguchi

[11] Patent Number: 4,677,285
[45] Date of Patent: Jun. 30, 1987

[54] IDENTIFICATION ARTICLE WITH PATTERN-FORM FRESNEL HOLOGRAM, FABRICATION THEREOF, AND VERIFICATION THEREOF

[75] Inventor: Yukio Taniguchi, Tokyo, Japan
[73] Assignee: Dai Nippon Insatsu Kabushiki Kaisha, Japan
[21] Appl. No.: 830,491
[22] Filed: Feb. 19, 1986

Related U.S. Application Data

[63] Continuation of Ser. No. 494,577, May 16, 1983, abandoned.

[30] Foreign Application Priority Data

May 18, 1982 [JP] Japan .................... 57-83816

[51] Int. Cl.⁴ ............................. G06K 19/02
[52] U.S. Cl. ................... 235/488; 235/457; 235/487; 430/1
[58] Field of Search ............... 283/86, 904; 235/457, 235/487, 488; 430/1, 2

[56] References Cited

U.S. PATENT DOCUMENTS

| | | | |
|---|---|---|---|
| 3,753,249 | 8/1973 | Silverman | 235/457 X |
| 3,894,756 | 7/1975 | Ward | 350/3.61 X |
| 4,014,602 | 3/1977 | Ruell | 430/1 X |
| 4,171,864 | 10/1979 | Jung et al. | 283/86 X |
| 4,269,473 | 5/1981 | Flothmann et al. | 283/86 X |
| 4,402,571 | 9/1983 | Cowan et al. | 350/3.61 X |

Primary Examiner—David L. Trafton
Attorney, Agent, or Firm—Parkhurst & Oliff

[57] ABSTRACT

An identification article comprise a substrate and a pattern-form Fresnel hologram provided as an identification information providing layer on the surface or in the interior of the substrate structure. The pattern-form Fresnel hologram is formed by (a) forming a Fresnel hologram by exposing a photosensitive resin layer to an interference light obtained from interference between an object light beam and a reference light beam both obtained by dividing a single coherent light, (b) exposing the Fresnel hologram to light transmitted through a mask pattern, (c) fabricating a pattern-form Fresnel hologram by developing the Fresnel hologram, and (d) reconstructing the pattern-form Fresnel hologram thus obtained. The identification article is verified by projecting a monochromatic light onto the hologram to reproduce an image and projecting this image on a screen or detecting it with a light detector.

21 Claims, 16 Drawing Figures

IDENTIFICATION ARTICLE WITH PATTERN-FORM FRESNEL HOLOGRAM, FABRICATION THEREOF, AND VERIFICATION THEREOF

This is a continuation of application Ser. No. 494,577 filed May 16, 1983, now abandoned.

BACKGROUND OF THE INVENTION

This invention relates to identification cards and the like provided with Fresnel holograms of pattern form, to a process for producing pattern-form Fresnel holograms, and to a method of verifying identification cards and the like provided with holograms.

At present, a great variety and great number of credit cards, cash cards, individual identification cards, transit tickets, commuters' passes, printed certificates, bank savings booklets, licenses, and the like are being used. In many instances, in order to prevent counterfeiting and other fraudulent acts, these articles of proof (hereinafter referred to collectively as ID article(s)), contain information of unique character for every ID article, which information cannot be directly read from the exterior and is recorded therein as a hidden or secret verification.

The most common method of recording such a secret verification is the magnetic recording method, which in may cases comprises providing a magnetic recording layer in a ribbon state at the upper part or a side part of an ID article and recording on this magnetic recording layer a secret number of four digits, for example, together with other information. The information thus recorded by this magnetic recording method is advantageous in that it is not visible from the outside and cannot be counterfeited by reproduction or duplication methods such as photographic and electrophotographic methods. However, since this method has been used over a long period, the magnetic recording and reproducing methods thereof are relatively well known and cannot be said to be positively proof against counterfeiting and leakage of information and counterfeiting and alteration of these ID articles are becoming a great social problem.

As a method capable of overcoming the inadequacy of this conventional magnetic recording method, the recording of necessary information by utilizing a diffraction grating or a certain kind of hologram has been proposed. This method, however, is also inadequate, being incapable of simultaneously satisfying the requirements of prevention of counterfeiting, facility of distinguishing the genuine or false nature of the ID article by visual inspection, and decorative nature or aesthetically pleasant appearance thereof.

SUMMARY OF THE INVENTION

As a result of my various studies directed toward overcoming the problems encountered in the prior art as described above, it was discovered that these problems can be solved at once by providing a Fresnel hologram of a pattern form on one part of an ID article. This invention is based on this finding and has the following principal objects.

(a) To provide an ID article which is difficult to counterfeit or alter and, moreover, has a beautiful exterior appearance by providing a Fresnel hologram formed in a pattern state on an ID article.

(b) To provide a process for producing a Fresnel hologram of a pattern form.

(c) To provide a method of verifying the authenticity of ID articles bearing holograms such as Fresnel holograms of pattern form.

An ID article according to this invention is characterized in that, on an outer surface or within the interior thereof, a Fresnel hologram of a pattern form is provided as identification information.

A pattern-form Fresnel hologram is produced according to this invention in another aspect thereof by a process comprising the steps of:

(a) forming a Fresnel hologram by exposing a photosensitive resin layer of a photosensitive base plate to an interference light obtained by causing interference between an object light beam and a reference light beam, which are both derived from a single coherent light beam divided into first and second coherent light beams, said object light beam being obtained by passing said first coherent light beam through a diffusion plate and a transmissive pattern or by causing it to be reflected by a reflective pattern, said reference light beam being said second coherent light beam;

(b) exposing the Fresnel hologram thus obtained to light transmitted through a mask pattern;

(c) fabricating a pattern-form Fresnel hologram by developing said Fresnel hologram thus exposed to light; and (d) depending on the necessity, reconstructing the pattern-form Fresnel hologram thus obtained.

According to this invention in still another aspect thereof, there is provided a method of verifying an identification article provided with a hologram as an identification information providing layer, which method comprises projecting a monochromatic light onto the hologram provided on a surface or in the interior of a substrate structure of the article to reproduce an image and forming the image thus reproduced on a screen or detecting said reproduced image by means of a light detector.

The nature, utility, and further features of this invention will be more clearly apparent from the following detailed description with respect to specific examples when read in conjunction with the accompanying drawings, briefly described below.

DETAILED DESCRIPTION OF THE INVENTION

Figure 1A:
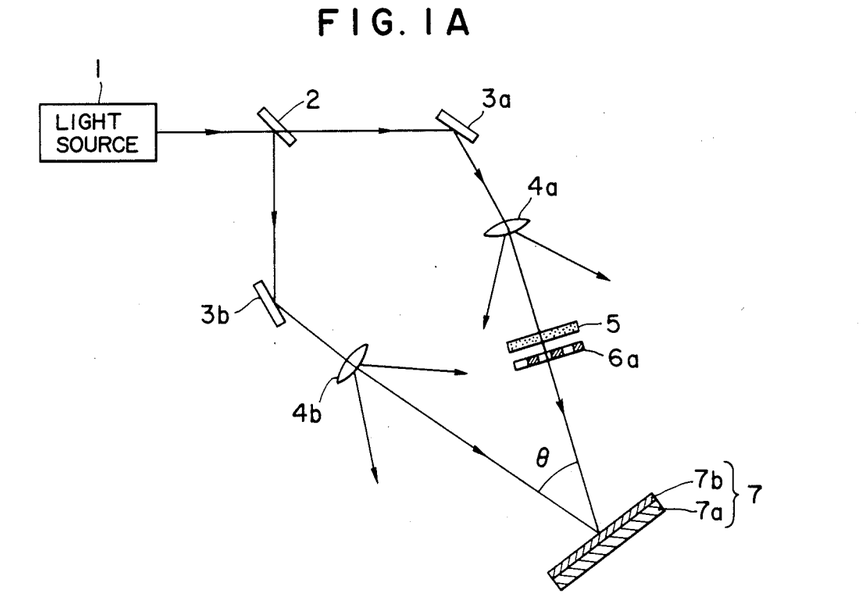
FIGS. 1A and 1B are schematic diagrams respectively indicating different process steps of projecting interference light onto a photosensitive substrate, each of these steps being the first step in process of this invention.
Figure 1B:
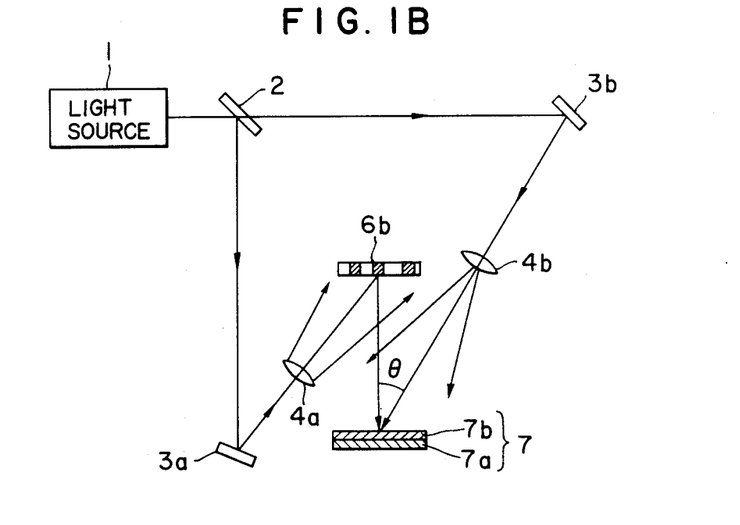

Referring first to FIGS. 1A and 1B, the process according to this invention for producing Fresnel holograms of pattern form will first be described. FIG. 1A relates to a method of fabricating a hologram with a transmissive pattern as an object. In this optical system, coherent light emitted by a light source 1 is divided by a half mirror 2 into two light beams. The coherent light of one beam (transmitted beam) is reflected by a mirror 3a, is passed through a lens 4a and through a light diffusing plate 5 and a transmission pattern 6, and, as an object beam, reaches a photosensitive base plate 7. The other coherent light beam (reflected beam) is reflected by a mirror 3b and passed through a lens 4b and, as a reference beam, reaches the photosensitive base plate 7. On the photosensitive base plate 7, the object beam and the reference beam undergo interference, and the resulting interference light is applied to the photosensitive base plate.

On the other hand, the optical system shown in FIG. 1B relates to a method of fabricating a hologram with a reflective pattern as an object. In this system, coherent light from the light source 1 is divided by a half mirror 2 into two light beams. One light beam (reflected beam) is reflected by a mirror 3a, passed through a lens 4a, and reflected by a two-dimensional reflecting pattern 6b and, as an object beam, reaches a photosensitive base plate 7. The other coherent light beam (transmitted beam) is reflected by a mirror 3b and passed through a lens 4b and, as a reference beam, reaches the photosensitive base plate 7. On this photosensitive base plate 7, the object beam and the reference beam undergo interference, and the resulting interference light is applied to the photosensitive base plate.

In each of the above described systems, a light source emitting a light matching the photosensitive wavelength of the photosensitive resin and having high coherence, preferably a laser light of Ar, He-Cd, or the like, is used. For the transmitted pattern, a negative or positive or like transparency of the desired secret code number, symbol, character, etc., can be used.

The photosensitive base plate 7 comprises a substrate 7a and a photosensitive resin layer 7b provided thereon. For the substrate 7a, a structure of sheet form or plate form of a material such as glass, a metal, a ceramic, a hard plastic, or paper is used. For the photosensitive resin layer 7b, a layer formed by applying as a coating a photoresist of positive type or of negative type, for example, can be used.

Examples of suitable positive resists are those of quinonediazido base such as AZ-1350 and AZ-111 manufactured by the Shipley Company and OFPR manufactured by Tokyo Ōka Kōgyō Company. Examples of suitable negative type resists are those of polyvinyl cinnamate base such as PR and KOR manufactured by the Kodak Company and TPR, SVR, etc., manufactured by Tokyo Ōka Kōgyō Company and those of azido compoundrubber base such as KMER and KTFR manufactured by the Kodak Company, OMR manufactured by Tokyo Ōka Kōgyō Company, and FSR and others manufactured by Fuji Yakuhin Company.

The photoresist layer can be formed by applying as a coating a photoresist solution adjusted to a viscosity suitable for its respective processing to form a coating of a thickness ordinarily of 0.1 to 10 μm by a sprinkling-flowing method or spinner coating and then drying to form a photosensitive resin layer.

The average interference fringe spacing d of the Fresnel hologram during the exposure of the photosensitive resin layer to the interference light as described above is determined by the angle $\theta$ between the optical axes of the two light beams respectively passing through the lenses 4a and 4b and by the wavelength $\lambda$ of the light and has the relationship $d = \lambda/2 \sin(\theta/2)$. Thus, as is apparent from this equation, by varying the angle $\theta$ or by varying the wavelength $\lambda$, the average interference fringe spacing d can be varied, and Fresnel holograms of different exterior appearances can be formed.

By applying interference light as described above onto the photosensitive resin on the photosensitive base plate, a latent image conforming to the intensity of the light due to interference between the aforedescribed two light beams is formed in the photosensitive resin layer. While, the foregoing description relates to a method wherein the exposure of the photosensitive resin to two light beams is carried out once, the exposure may be carried out to multiple light beams of a number exceeding two, or the photosensitive base plate may be rotated for each exposure thereby to carry out several exposures, whereby a Fresnel hologram of even greater complexity can be obtained.

Figure 2:
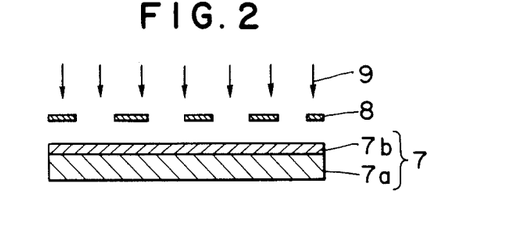
FIG. 2 is a sectional view indicating a process step in which a photosensitive substrate plate is exposed to light projected through a mask.

Next, onto the photosensitive base plate 7 which has been exposed to the interference light as described above, light 9 is projected through a mask pattern 8 as shown in FIG. 2. A suitable light-transmitting pattern can be used for this mask pattern 8. For the projected light 9, ultraviolet rays, preferably of a wavelength of 0.25 to 0.45 μm emitted from a light source such as an ultra-high-voltage mercury-vapor lamp, a high-voltage mercury-vapor lamp, a low-voltage mercury-vapor lamp, a carbon-arc lamp, a xenon-arc lamp, or a metal-halide lamp is used. Good results are obtained by so irradiating that the integrated exposure will be 10 mJ/cm$^2$ or more.

Figure 3A:
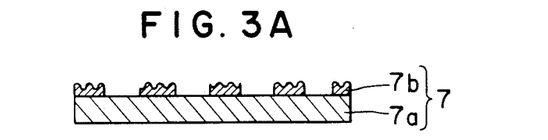
FIGS. 3A and 3B are schematic sectional views showing pattern-form Fresnel holograms obtained after development respectively with positive and negative photoresists.
Figure 3B:
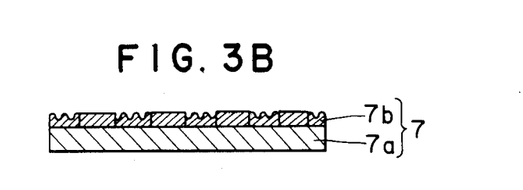

As a consequence of exposure to light passed through the above described mask pattern, the parts of the photosensitive resin layer thus exposed undergo decomposition in the case where this resin layer is of the positive type. On the other hand, in the case of a negative type resin layer, the photosensitive resin layer parts thus exposed harden. As a result, upon developing with the use of a developer, a Fresnel hologram of a pattern form as indicated in FIG. 3a or FIG. 3b is obtained. FIGS. 3a and 3b show states of pattern forms after developing respectively for the case where a positive type photoresist is used and the case where a negative type photoresist is used.

Furthermore, in order to cause the Fresnel hologram formed on the photosensitive resin layer 7b of the base plate 7 to assume a pattern form, a screening or shielding structure such as, for example, a printing ink layer, a coating layer, or a shielding substance formed into a pattern may be provided on a specific part of the Fresnel hologram. Alternatively, measures such as thermally destroying specific parts of the Fresnel hologram, mechanically cutting out such parts, or applying a transparent coating on such parts may be taken. Still another suitable method which may be used comprises reconstructing by press forming or by using a radiation curable resin from a pattern-form Fresnel hologram which has once been formed thereby to form a pattern-form Fresnel hologram.

The pattern-form Fresnel hologram of this invention is formed not only on a photosensitive resin layer but also by using a photosensitive material such as a silver salt or gelatin dichromate. In such a case, the patternizing of the Fresnel hologram is carried out by providing a screening structure such as, for example, a printing ink layer, a coating layer, or a pattern-form screening substance on specific parts of the Fresnel hologram or by mechanically cutting out the specific parts.

A Fresnel hologram produced by the process of this invention has a hologram image recorded by fine concavities and convexities of its surface. For this reason the following modes of reconstruction can be carried out.

(a) Reconstruction by fabricating by electrocasting a metal mold having inverted-mold shape of the pattern-form Fresnel hologram and, by using this mold and a hot press, embossing on a thermoplastic synthetic resin sheet or plate.

(b) Reconstruction by applying as a coating a resin solution which is curable by ultraviolet ray or electron beam irradiation on the mold of (a) above or the reconstructed product obtained by (a) above as a matrix and curing the resin solution by irradiation with ultraviolet rays or an electron beam, or by using a reconstructed product obtained further as a matrix.

Since the pattern-form Fresnel hologram obtained by the process of this invention is produced in the above described manner, it is a pattern imparting iridescence in outer appearance, but a hologram obtained by irradiation with a laser beam for hologram reproduction can be imaged on a screen. By so doing, it can be compared with a previously prepared reference pattern and can be used just as means for verifying a hidden number of a magnetic card. For reproduction, a monochromatic light is used, but laser light is preferable. For laser light, for example, He-Ne laser, Ar laser, He-Cd laser, Kr laser, and semiconductor laser can be used. Depending on the necessity, the laser light can be constricted by using lenses and the like. Furthermore, the incidence angle of the laser beam for reproduction is a suitable angle determined by the optical system at the time of fabrication of the Fresnel hologram.

The reconstructed product obtained in the above described manner can be used, as it is, as a transmissive type when it is constituted with a transparent material. However, even if this material is transparent, the product can be made into a reflective type by coating its surface with a reflective layer of an evaporation deposited metal film such as aluminum film to a thickness of 100 to 1,000 Å.

The process for producing ID articles 10 in each of which a pattern-form Fresnel hologram has been provided according to this invention will now be described with reference to FIGS. 4 through 12B. These ID articles 10 can be produced according to this invention by any of several modes.

Figure 4:
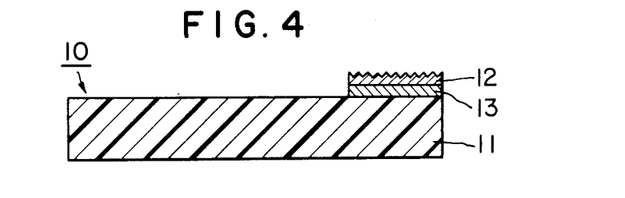
FIGS. 4, 5 and 6 are sectional views respectively showing different examples of ID articles (cards) according to the invention.
Figure 5:
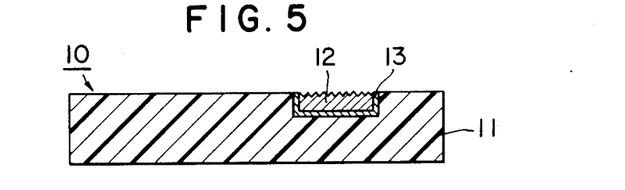
Figure 6:
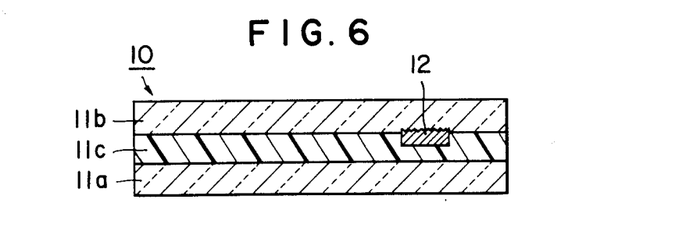

For example, in one mode, a pattern-form Fresnel hologram 12 is fabricated separately from a substrate 11 and then is bonded onto a surface of the substrate 11 with an adhesive 13 as shown in FIG. 4. In another mode, a hologram insetting recess is formed by a suitable process in one part of the substrate sheet 11, and the pattern-form Fresnel hologram 12 is fitted into and bonded to this recess by an adhesive 13 as shown in FIG. 5. In still another mode, as indicated in FIG. 6, a substrate layer 11c provided in a surface portion thereof with a pattern-form Fresnel hologram 12 is sandwiched in laminated state between a pair of transparent substrate layers 11a and 11b. The substrates 11 in these ID articles are in the form of sheets or plates of synthetic resins, paper materials, metals, other materials, and laminated composites thereof.

Figure 7:
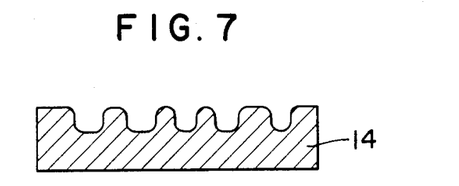
FIG. 7 is a sectional view of a mold for reconstructing a pattern-form Fresnel hologram.
Figure 8:
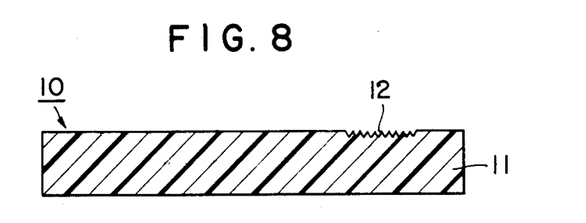
FIG. 8 is a sectional view of one example of an ID article (card) of the invention.

In a further mode of practice, a mold 14 for reconstruction corresponding to the desired patternform Fresnel hologram is fabricated beforehand as indicated in FIG. 7, and then, by using this mold 14, one portion of a thermoplastic sheet is press formed by means of a flat press or rolls thereby to form the pattern-form Fresnel hologram 12 directly on the substrate sheet 11 as indicated in FIG. 8. In the case where a flat press is used, it is preferable that this press forming be carried out with heating under the conditions of a heating plate temperature of 50° to 500° C. and a pressure of 0.1 to 100 kg/cm². In the case where rolls are used, it is preferable that the press forming be carried out with heating under the conditions of a roll temperature of 50° to 500° C. and a line pressure of 0.1 to 100 kg/cm². Examples of thermoplastic sheets which can be used are sheets made of polyethylene, polypropylene, polyvinyl chloride, polyvinyl alcohols, polyethylene terephthalate, polycarbonate, and polystyrene and having a thickness of 0.01 to 10 mm, preferably 0.1 to 1 mm.

Figure 9:
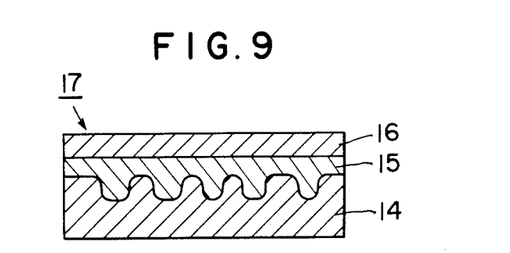
FIG. 9 is a sectional view of a laminated structure appearing during the fabrication of a patternform Fresnel hologram with the use of the above mentioned mold for reconstruction.
Figure 10:
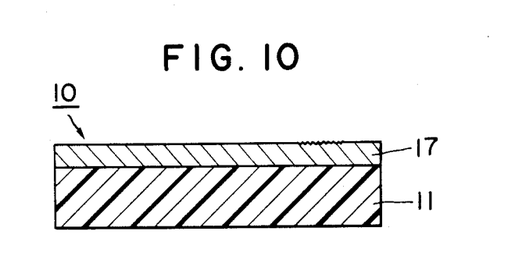
FIG. 10 is a sectional view of another example of an ID article (card) of the invention.

Alternatively, as indicated in FIG. 9, a coating of a resin 15 curable by ultraviolet-ray irradiation is applied onto the abovementioned mold 14 for reconstruction by any suitable coating method such as roll coating, knife coating, wire bar coating, gravure coating, and screen printing, and then, on this ultraviolet-ray-curable resin film 15, a support layer 16 is caused to adhere closely by a method such as applying pressure. Thereafter, the resin film 15 is irradiated with ultraviolet rays thereby to cure the same and to form a laminated structure 17 of the support layer 16 and the resin film 15. Then, by bonding this laminated structure 17 onto an ID article, an ID article 10 provided with a pattern-form Fresnel hologram as shown in FIG. 10 is produced.

In some cases, instead of providing a support layer 16 on the above mentioned ultraviolet-ray-curable resin film 15, this resin film 15 may be irradiated directly with ultraviolet rays and thus cured. Examples of materials suitable for the support layer 16 are glass, polyethylene, polypropylene, polyvinyl chloride, polyvinylidene chloride, polyethylene terephthalate, polycarbonate, acrylic resins, and polystylene, used singly or in combination.

By providing a reflective layer on the reverse surface of a transmissive-type pattern-form Fresnel hologram, a reflective-type pattern-form Fresnel hologram can be obtained. In this case the reflective layer is an evaporation deposited layer of aluminum, gold, silver, tin, or an alloy thereof of a film thickness of 50 to 5,000 Å, preferably 300 to 1,000 Å. This reflective layer is formed by a technique such as vacuum evaporation deposition, sputtering, or ion-plating.

The mold for reconstruction corresponding to a pattern-form Fresnel hologram can be fabricated by providing by a method such as evaporation deposition a layer of a metal such as silver as a pretreatment layer for plating or a peeling layer on the recording surface (surface of concavities and convexities) of the pattern-form Fresnel hologram obtained, forming thereon a plating layer of a metal such as nickel, and then peeling off this plating layer.

The method according to this invention of verifying ID articles provided with holograms such as pattern-form Fresnel holograms will now be described with reference to FIGS. 11A and 11B.

Figure 11A:
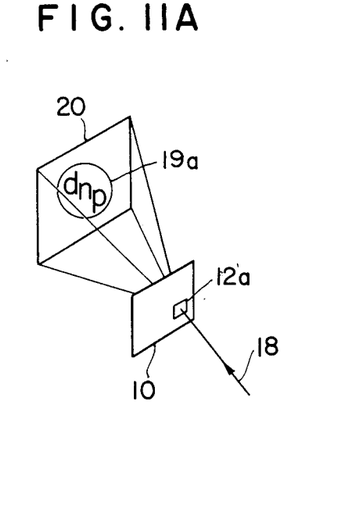
FIGS. 11A and 11B are schematic perspective views respectively indicating different modes according to the invention of verifying the authenticity of ID articles by projection of images onto screens.

FIG. 11A relates to a mode of verifying an ID article 10 provided with a transmissive-type hologram 12a. A monochromatic light 18 such as a laser beam, which is the reproducing beam, is projected toward and through the transmissive-type hologram 12a to form a reproduced image 19a on a screen 20. FIG. 11B relates to a mode of verifying an ID article provided with a reflective-type hologram 12b. A monochromatic light 18 such as a laser beam used as a reproducing beam is projected onto and reflected by the reflective-type hologram 12b to form a reproduced image 19b on a screen 20. For the reproducing light beam, a monochromatic light 18 is used, laser light being preferable. Examples of suitable kinds of laser light are He-Ne laser, Ar laser, He-Cd laser, Kr laser, and semiconductor laser.

While holograms such as patternized Fresnel holograms, Fresnel holograms, Fourier converted holograms, and Fraunhofer holograms can be used, patternized Fresnel holograms are preferred.

The diameter of the reproducing laser beam can be constricted by means such as lenses depending on the necessity. The projection or incidence angle of the laser beam relative to the hologram is determined in correspondence with the optical system at the time of formation of the hologram.

Figure 12A:
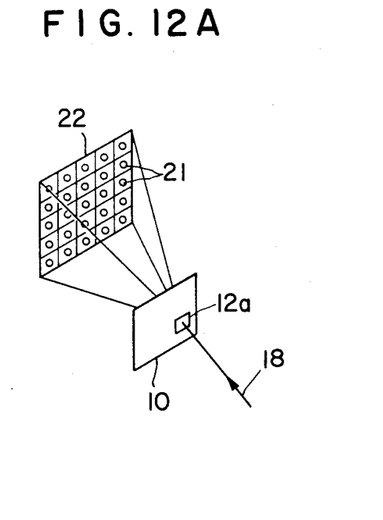
FIGS. 12A and 12B are schematic perspective views respectively indicating different modes according to the invention of verifying the authenticity of ID articles by projection of images onto photodiode arrays.
Figure 12B:
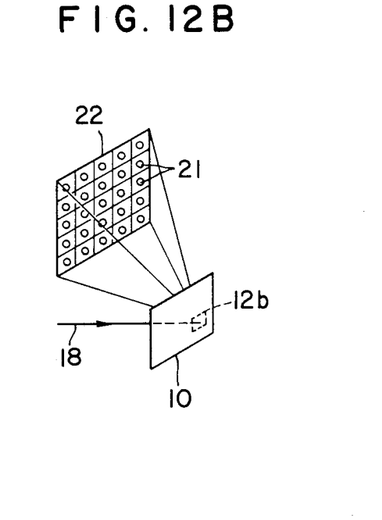

In the above described examples of the method of verification according to this invention, the reproduced image is formed on a screen and is verified visually. In some cases, however, the reproduced image formed on the screen can be detected by using a detecting device such as a light detector or sensor. Furthermore, as shown in FIGS. 12A and 12B, the authenticity of an ID article can be automatically discriminated by forming the reproduced image, not on a screen, but directly at a specific position on a light detector 22 comprising a photodiode array 21, 21, ... thereby to cause generation of a signal corresponding to this image and comparing this signal with a signal previously stored in a memory device.

The identification article may further include a magnetic recording layer as the identification providing layer.

In order to indicate more fully the nature and utility of this invention, the following specific examples of practice thereof are set forth, it being understood that these examples are presented as illustrative only and are not intended to limit the scope of this invention.

EXAMPLE 1

On a glass plate of 2-mm thickness and a length and width each of 5 cm, a positive-type photoresist (AZ-1350 J, produced by the Shipley Company) was so applied as to obtain a coating of a thickness of 2 $\mu$m thereby to fabricate a photosensitive structure.

Next, by using the optical system illustrated in FIG. 1A, an Ar laser beam of a wavelength of 488 nm and an output of 1 W, a ground glass of 2-mm thickness as a light-diffusing plate, and an object comprising a silver chloride photographic film with a symbol mark as a transmissive pattern, a Fresnel hologram was recorded.

Next, as shown in FIG. 2, the photosensitive structure was irradiated for 1 minute with ultraviolet rays emitted by an ultrahigh-voltage mercury-arc lamp through a mask under the condition of 5 W/m$^2$. Thereafter, by carrying out development for 5 minutes with the use of a developer solution (AZ developer, manufactured by Shipley Company), a pattern-form Fresnel hologram (hereinafter referred to as a relief hologram) in which was recorded a Fresnel hologram of a pattern form wherein the parts not covered by the mask had been dissolved and removed was obtained.

On the recording surface (surface with concavities and canvexities) of the relief hologram obtained as described above, silver was deposited by evaporation to a thickness of approximately 500 Å, and then this silver surface was further plated with nickel to a thickness of 0.5 mm. This nickel-plate layer was peeled off thereby to fabricate a relief hologram mold.

Then, by using this relief hologram mold, a base film (50-$\mu$ Mylar film) was caused to adhere closely over an ultraviolet-ray-curable resin solution (APR produced by Asahi Kasei K.K.) as indicated in FIG. 9. Then the resulting structure in this state was irradiated with ultraviolet rays from the base film side to cure the resin solution. Thereafter the laminated structure of the base film and the resin thus cured was peeled off from the mold thereby to obtain a transmissive-type hologram. Then, by repeating this process, a large number of transmissive-type holograms were obtained.

Each of these trahsmissive-type holograms was sandwiched and bonded between two ID article substrate materials with recessed parts as shown in FIG. 5 and cut out to a suitable size to fabricate an ID article. For the ID article substrate material, thick paper of 0.3-mm thickness was used, and for the bonding, Cemedine Hi-Contact (produced by Cemedine K.K.) was used.

In this ID article (card), merely a beautiful iridescence could be seen visually in pattern form from the hologram, but when a laser beam (He-Ne laser, 1 mW) was projected onto the recorded portion of the hologram as indicated in FIG. 11A, the symbol mark recorded in the hologram was projected on the screen.

EXAMPLE 2

An aluminum film to serve as a reflective surface was deposited by evaporation to a film thickness of approximately 800 Å onto the relief surface (hologram recording surface) of the relief hologram of transmissive type obtained in Example 1 thereby to produce a reflective-type hologram. This reflective-type hologram was cut to the size of the hologram pattern and bonded to a vinyl chloride sheet of 0.7-mm thickness with an adhesive (Cemedine Hi-Contact, manufactured by Cemedine K.K.). Thereafter, the resulting structure was cut out with a suitable size thereby to obtain an ID article (card) of the type shown in FIG. 4. Visually, this card exhibited at its hologram part an iridescence in pattern form and had an excellent, aesthetically pleasant appearance in design and decorativeness.

Figure 11B:
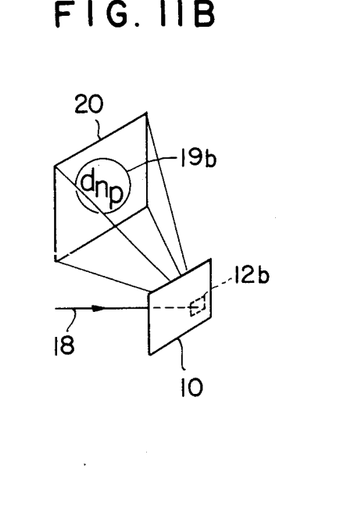

Further, the recording part of the hologram was irradiated with a laser beam (He-Ne laser, 1 mW) as indicated in FIG. 11B, whereupon the symbol mark recorded in the hologram was projected onto the screen.

EXAMPLE 3

The hologram made in Example 2 was fitted into a recess in a vinyl chloride sheet of 0.7-mm thickness embossed with the same configuration as the hologram on an ID article (card) substrate material. Further thereon, a transparent adhesive sheet (Fuji Clear 16, manufactured by Fuji Shikō K.K.) was bonded to fabricate an integral card. This card had the same functional capacity and effectiveness as that of Example 2. Furthermore, since it was flat, it was desirable as an ID card. In addition, because its hologram was protected by the adhesive sheet, this card was suited to practical use.

EXAMPLE 4

As a mold-parting layer, silver was deposited by evaporation to a thickness of 1,000 Å on the relief surface of the relief hologram mold fabricated as in Example 1, and then this silver layer was further plated with nickel to a layer thickness of 0.5 mm. This nickel plated layer was peeled off, and a relief hologram mold of the same configuration as the relief hologram recorded in the photoresist was fabricated. With the use of this mold and by the procedure set forth in Example 1, a reconstructed hologram was made by using an ultraviolet-ray-curable resin. Aluminum was further deposited by evaporation, whereby a reflective-type hologram of an inverted relief configuration relative to that of Example 1 was obtained.

Onto the aluminum evaporation deposited surface (surface of concavities and convexities) of this reflective-type hologram, a heat-seal agent (ASV-8, manufactured by Morohoshi Ink K.K.) was applied to form a coating of $2\mu$ thickness. After the hologram was cut to a suitable size, it was superposed on a vinyl chloride sheet used as a card substrate so that its surface coated with the heat-seal agent was in contact with the vinyl chloride sheet. Then the resulting laminated structure was clamped between mirror-surface plates and subjected to heating at 170° C. under a pressure of 50 kg/cm$^2$. Then after being cooled, the heat-sealed structure was taken out from between the plates and was found to be an integrated card of the hologram and the card substrate material. This card was found to have a functional capacity and effectivenss similar to those of the card of Example 2. Furthermore, since the relief surface of the hologram was not exposed at the outer surface, the card had excellent physical strength and durability.

EXAMPLE 5

By using a reflective-type hologram fabricated as in Example 2, the hologram was disposed at a specific position between transparent vinyl chloride sheet materials, which were then subjected to heat pressing from above and below at 170° C. and under 50 kg/cm$^2$ 15 minutes. The resulting laminated structure was cooled and then taken out from the press, whereupon a card of the structure indicated in FIG. 6 was obtained.

This card, also, was found to have functional capacity and effectiveness similar to those of the card of Example 2 and to be a card having good durability.

It was found that, by using a hologram fabricated as in Example 4 and reversing the front and rear faces of the hologram relative to those of the example described above, also, a similar card was obtained.

EXAMPLE 6

The relief surface of a relief hologram mold fabricated as in Example 1 and a vinyl chloride sheet of 0.8-mm thickness to become a card substrate material were superposed together to form a laminated structure, which was then heat pressed from above and below at 170° C. under 50 kg/cm$^2$ for 15 minutes. After cooling, the vinyl chloride sheet was taken out, whereupon a card on a surface of which a hologram of this invention was recorded as shown in FIG. 8 was obtained. By using a transparent vinyl chloride sheet for the substrate material of this card, a transmissive-type hologram was added, and a card having a functional capacity equivalent to that of the card described in Example 1 was obtained.

Furthermore, by depositing aluminum by evaporation to a thickness of approximately 700 Å on the hologram recording surface, a card having a functional capacity equivalent to that of the card described in Example 2 was obtained.

EXAMPLE 7

The relief surface of a relief hologram mold fabricated as in Example 1 and a vinyl chloride sheet of 0.8-mm thickness to become a card substrate material were superposed in close contact with a solution of a resin curable by electron beam irradiation (Solex 9119, manufactured by Seikō Adobansu K.K.) interposed therebetween. An electron beam of 100 Mrad was then projected onto the thus laminated structure from the side of the vinyl chloride sheet thereby to cure and harden the resin solution. Thereafter, the mold was peeled off, whereupon a card of the structure shown in FIG. 10 was obtained.

This card was equivalent to that described in Example 6 and had a similar effectivenss.

EXAMPLE 8

For verification of the authenticity of each of the cards described in the preceding Examples 1 through 7, a laser beam was projected from a specific direction onto a photodetector array hologram as shown in FIGS. 12A and 12B instead of the screen shown in FIG. 11A or FIG. 11B, and the pattern light thus generated entered photodiodes at specific positions to generate a corresponding signal. By comparing this signal with a previously recorded signal, it was possible to determine the authenticity of each card.

What is claimed is:

1. An identification article comprising a substrate structure and a pattern-form identification information providing layer comprising a transparent resin layer and a reflective metallic layer thereunder, said pattern appearing on a surface of said resin layer and being formed of at least a first and a second portion, said first portion having fine concavities and convexities on the surface thereof, said second portion being essentially smooth, said first portion containing latent holographic information, said first portion being visually distinct from said second portion, said first and second portions cooperating to convey visual identification information, one of said first and second portions displaying said visual identification information, and the other of said first and second portions forming a background for said visual identification information.

2. An identification article according to claim 1 which is adapted for the application to one of the group consisting of a cash card, a credit card, an individual identification certificate, a transportation ticket, an admission ticket, a commuter's pass, a bank savings account book, a license certificate, and a printed certificate.

3. An identification article according to claim 1 in which the substrate structure is a structure of sheet form or plate form of a material selected from the group consisting of a synthetic resin, a paper, and a metal.

4. An identification article according to claim 1 in which a magnetic recording layer is further provided as the identification providing layer.

5. A process for producing an identification article comprising a substrate structure and a pattern-form identification information providing layer which contains both visual identification information and latent holographic information, said process comprising the steps of:

(a) forming on the surface of a photosensitive resin a latent image of a Fresnel hologram by exposing a photosensitive resin layer of a photosensitive base plate to an interference light obtained by causing interference between an object light beam and a reference light beam, both light beams being derived from a single coherent light beam divided into first and second coherent light beams, said object light beam being obtained by at least one of passing said first coherent light beam through a diffusion plate and a transmissive pattern and causing it to be reflected by a reflective pattern, said reference light beam being said second coherent light beam;

(b) exposing the Fresnel hologram thus obtained to ultraviolet light transmitted through a mask pattern, said photosensitive resin being at least one of a positive type photoresist and a negative type photoresist; and (c) fabricating said information providing layer by developing said Fresnel hologram, said visual identification information being conveyed by a pattern being formed of a first portion and a second portion, said first portion having fine concavities and convexities on the surface thereof and said second portion being essentially smooth, said Fresnel hologram being contained on said first portion of the information providing layer, one of said first and second portions displaying said visual identification information, and the other of said first and second portions forming a background for said visual identification information.

6. A process for producing a Fresnel hologram according to claim 5 in which said single coherent light beam which is divided into first and second coherent light beams is a laser beam.

7. A process for producing a Fresnel hologram according to claim 5 in which the light to which the Fresnel hologram formed in step (a) is exposed in step (b) through a mask pattern is ultraviolet-ray light of a wavelength of 0.25 to 0.45 μm.

8. A method of verifying an identification article which conveys both visual and latent identification information, said identification article including a visually distinctive pattern which conveys said visual identification information, said pattern being formed of a first portion and a second portion of a transparent resin layer having a reflective metallic layer thereunder, said first portion having fine concavities and convexities on the surface thereof and said second portion being essentially smooth, said two portions cooperating to create said visually distinctive pattern, one of said first and second portions displaying said visual identification information, and the other of said first and second portions forming a background for said visual identification information, said latent information being contained in said first portion, said method comprising projecting a monochromatic light onto said article to reproduce an image by reflecting said monochromatic light from said reflective metallic layer under said pattern and identifying the image thus reproduced.

9. A method of verifying an identification article according to claim 8 in which saidaonochromatic light is a laser beam.

10. A method of verifying an identification article according to claim 8 in which the identification article is selected from the group consisting of a cash card, a credit card, an individual certificate, a transportation ticket, a commuter's pass, a bank savings booklet, a license certificate, and a printed certificate.

11. An identification article according to claim 1 in which the substrate structure is a laminated composite structure of a material selected from the group consisting of a synthetic resin, a paper, and a metal.

12. An identification article according to claim 1 in which the substrate structure and the pattern-form identification information providing layer are in a laminated form with an adhesive interposed therebetween.

13. A method of verifying an identification article according to claim 8 in which said idnetification is obatined by forming said image on a screen.

14. A method of verifying an identification article according to claim 8 in which said identifying is carried out by detecting said reproduced image by means of a light detector.

15. A process for producing an identification article according to claim 5, said process further comprising reforming the Fresnel hologram after developing the Fresnel hologram.

16. The identification article according to claim 1, wherein the pattern is formed on a surface of the substrate.

17. The identification article according to claim 1, wherein the pattern is formed on an interior of the substrate.

18. The process for producing the identification article according to claim 5, wherein the pattern is formed on a surface of the substrate.

19. The process for producing the identification article according to claim 5, wherein the pattern is formed onan interior of the substrate.

20. The method for verifying an identification article according to claim 8, wherein the pattern is formed on a surface of the substrate.

21. The method for verifying an identification article according to claim 8, wherein the pattern is formed on an interior of the substrate.

* * * * *